United States Patent
Roffe et al.

(10) Patent No.: US 10,683,891 B1
(45) Date of Patent: Jun. 16, 2020

(54) STACKED THRUST BEARING ARRANGEMENT

(71) Applicant: Schaeffler Technologies AG & Co. KG, Herzogenaurach (DE)

(72) Inventors: Dennis Roffe, Fort Mill, SC (US); James Brown, Rock Hill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/213,212

(22) Filed: Dec. 7, 2018

(51) Int. Cl.
| | |
|---|---|
| F16C 19/04 | (2006.01) |
| F16C 19/30 | (2006.01) |
| F16C 33/04 | (2006.01) |
| F16C 27/08 | (2006.01) |
| F16C 21/00 | (2006.01) |
| F16C 33/58 | (2006.01) |
| F16C 19/48 | (2006.01) |

(52) U.S. Cl.
CPC .............. *F16C 21/00* (2013.01); *F16C 19/30* (2013.01); *F16C 19/48* (2013.01); *F16C 27/08* (2013.01); *F16C 33/04* (2013.01); *F16C 33/583* (2013.01)

(58) Field of Classification Search
CPC ........ F16C 19/30; F16C 19/305; F16C 19/48; F16C 21/00; F16C 27/066; F16C 27/08; F16C 33/04; F16C 33/583; F16C 33/588
USPC ........ 384/455, 551, 559, 590, 618–621, 608
See application file for complete search history.

(56) References Cited

U.S. PATENT DOCUMENTS

| | | | | |
|---|---|---|---|---|
| 3,934,956 | A * | 1/1976 | Pitner | F16C 19/30 384/455 |
| 4,733,979 | A * | 3/1988 | Tsuruki | F16C 19/30 384/620 |
| 5,110,223 | A * | 5/1992 | Koch | F16C 19/30 384/620 |
| 5,967,674 | A * | 10/1999 | Reubelt | F16C 19/30 384/620 |
| 6,592,265 | B1 * | 7/2003 | Rossi | B21B 13/023 384/619 |
| 6,857,787 | B1 * | 2/2005 | Meier | F16C 19/10 384/619 |
| 8,348,515 | B2 * | 1/2013 | Fugel | F16C 33/588 384/620 |
| 8,523,453 | B2 | 9/2013 | Loeschner et al. | |
| 8,821,028 | B2 * | 9/2014 | Fugel | F16C 35/06 384/621 |
| 9,080,607 | B2 * | 7/2015 | Gooden | F16C 33/586 |
| 9,309,921 | B2 * | 4/2016 | Kanai | F16H 49/001 |
| 9,528,559 | B2 * | 12/2016 | Lee | F16D 23/145 |

(Continued)

FOREIGN PATENT DOCUMENTS

| | | | | |
|---|---|---|---|---|
| FR | 2222896 A5 | * | 10/1974 | ............. F16C 19/30 |
| JP | 2004308711 A | * | 11/2004 | ............. F16C 19/10 |
| JP | 2004308712 A | * | 11/2004 | ............. F16C 23/10 |

*Primary Examiner* — Marcus Charles
(74) *Attorney, Agent, or Firm* — Volpe and Koenig, P.C.

(57) ABSTRACT

A stacked thrust bearing arrangement including a central washer arranged between a first and second bearing assembly is disclosed. The central washer is axially positioned between a first inner bearing ring of the first bearing assembly, and a second inner bearing ring of the second bearing assembly. An inner sleeve defines a first retention flange adapted to engage a first cage of the first bearing assembly, and a second retention flange adapted to engage a second cage of the second bearing assembly.

14 Claims, 4 Drawing Sheets

(56) References Cited

U.S. PATENT DOCUMENTS

| | | | |
|---|---|---|---|
| 9,933,010 B2 | 4/2018 | Brown et al. | |
| 10,228,017 B2* | 3/2019 | Roffe | F16C 19/305 |
| 2011/0182542 A1 | 7/2011 | Brown et al. | |
| 2011/0290610 A1* | 12/2011 | Arnold | F16D 3/66 |
| | | | 192/48.1 |
| 2016/0230809 A1 | 8/2016 | Roffe et al. | |

* cited by examiner

STACKED THRUST BEARING ARRANGEMENT

FIELD OF INVENTION

The present invention relates to a stacked thrust bearing arrangement.

BACKGROUND

Bearings are generally used in a wide range of application. One type of bearing is a thrust bearing, which is designed to accommodate axial loads. One specific type of thrust bearing is a stacked bearing, which includes multiple bearing sub-assemblies with multiple rows of rolling elements.

Known arrangements of bearing arrangements are disclosed in U.S. Pat. Nos. 8,523,453 and 6,857,787. Tiered bearings are disclosed in US Pub. 2016/0230809 and U.S. Pat. No. 9,933,010. An isolating layer in a bearing assembly is disclosed in US Pub. 2011/0182542.

Some known thrust bearing arrangements include a common central washer sandwiched between two bearing assemblies. These common central washers are formed from metal and define raceways on either axial side of the washer. These known washer suffer undesirable wear and slippage, which causes excessive noise and reduces efficiency.

It would be desirable to provide an improved stacked thrust bearing arrangement that does not suffer from excessive wear or inefficiencies, and also does not produce undesirable noise.

SUMMARY

An improved stacked thrust bearing arrangement is disclosed.

The stacked thrust bearing arrangement includes a first bearing assembly including a first outer bearing ring, a first inner bearing ring, a first cage, and a first plurality of rolling elements. The first outer bearing ring defines a first outer axial raceway for supporting the first plurality of rolling elements and the first inner bearing ring defines a first inner axial raceway for supporting the first plurality of rolling elements. The first cage defines a first plurality of pockets for the first plurality of rolling elements. A second bearing assembly includes a second outer bearing ring, a second inner bearing ring, a second cage, and a second plurality of rolling elements. The second outer bearing ring defines a second outer axial raceway for supporting the second plurality of rolling elements and the second inner bearing ring defines a second inner axial raceway for supporting the second plurality of rolling elements. The second cage defines a second plurality of pockets for the second plurality of rolling elements. A central washer is axially positioned between the first inner bearing ring and the second inner bearing ring. An inner sleeve defines a first retention flange adapted to engage the first cage and a second retention flange adapted to engage the second cage.

In one embodiment, the first inner bearing ring and the second inner bearing ring are each formed from steel.

In one embodiment, the inner sleeve defines a first groove adapted to receive an inner portion of the first cage, and defines a second groove adapted to receive an inner portion of the second cage.

In one embodiment, the central washer has a thickness (ta) that is less than a thickness (tb) of the first inner bearing ring and the second inner bearing ring.

In one embodiment, the central washer, the first inner bearing ring, and the second inner bearing ring have a combined thickness (tc), and the combined thickness is 20%-30% of an overall thickness (to) of the stacked thrust bearing arrangement.

In one embodiment, the central washer has a radial depth that is equal to or less than a radial depth of the first inner bearing ring and the second inner bearing ring.

In one embodiment, the central washer has a uniformly flat profile.

In one embodiment, the first outer bearing ring and the second outer bearing ring each have an L-shaped profile including axially inwardly extending flanges.

In another embodiment, a stacked thrust bearing arrangement includes a first bearing assembly including at least one first bearing ring, a second bearing assembly including at least one second bearing ring, and an inner sleeve defining a first retention flange adapted to engage the first bearing assembly and a second retention flange adapted to engage the second bearing assembly. A central washer is axially positioned between the at least one first bearing ring and the at least one second bearing ring. The central washer being formed from rubber, and the at least one first bearing ring and the at least one second bearing ring being formed from steel.

Additional embodiments are disclosed herein.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
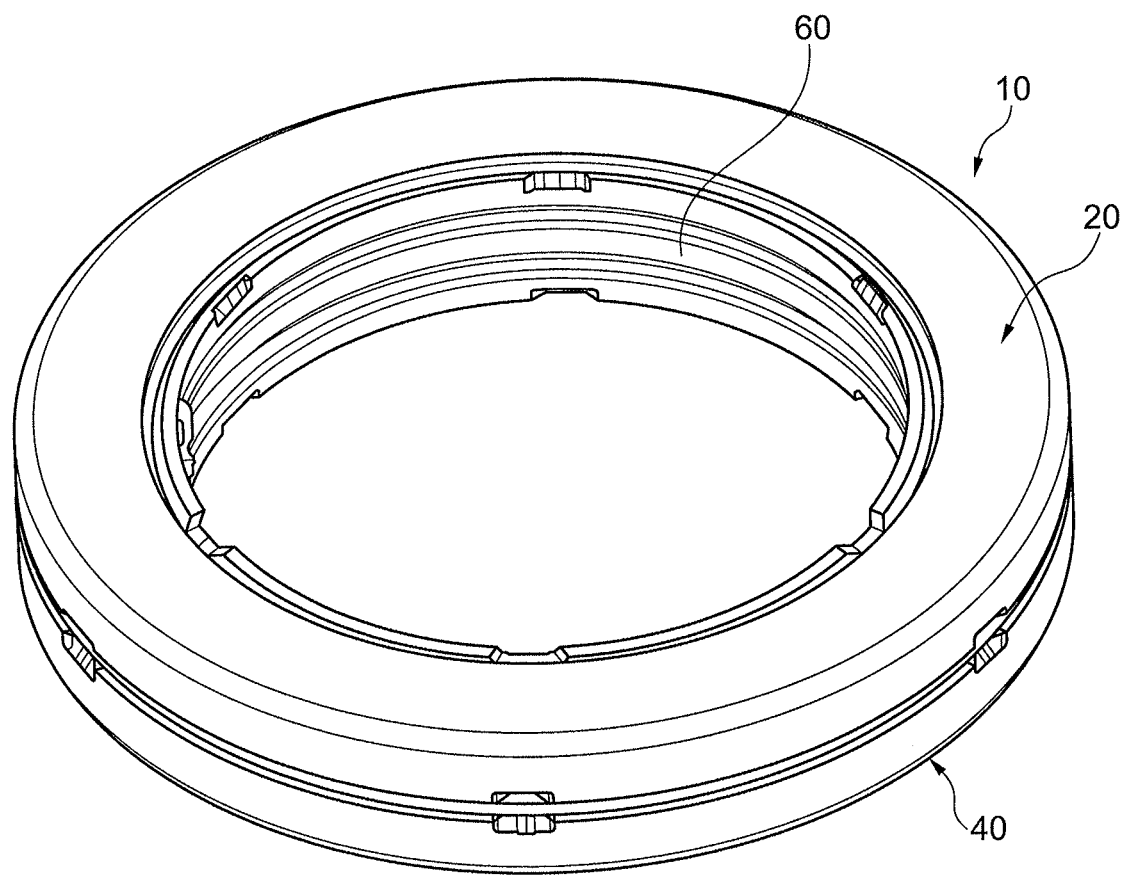
FIG. 1 is a perspective view of a thrust bearing arrangement according to an embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
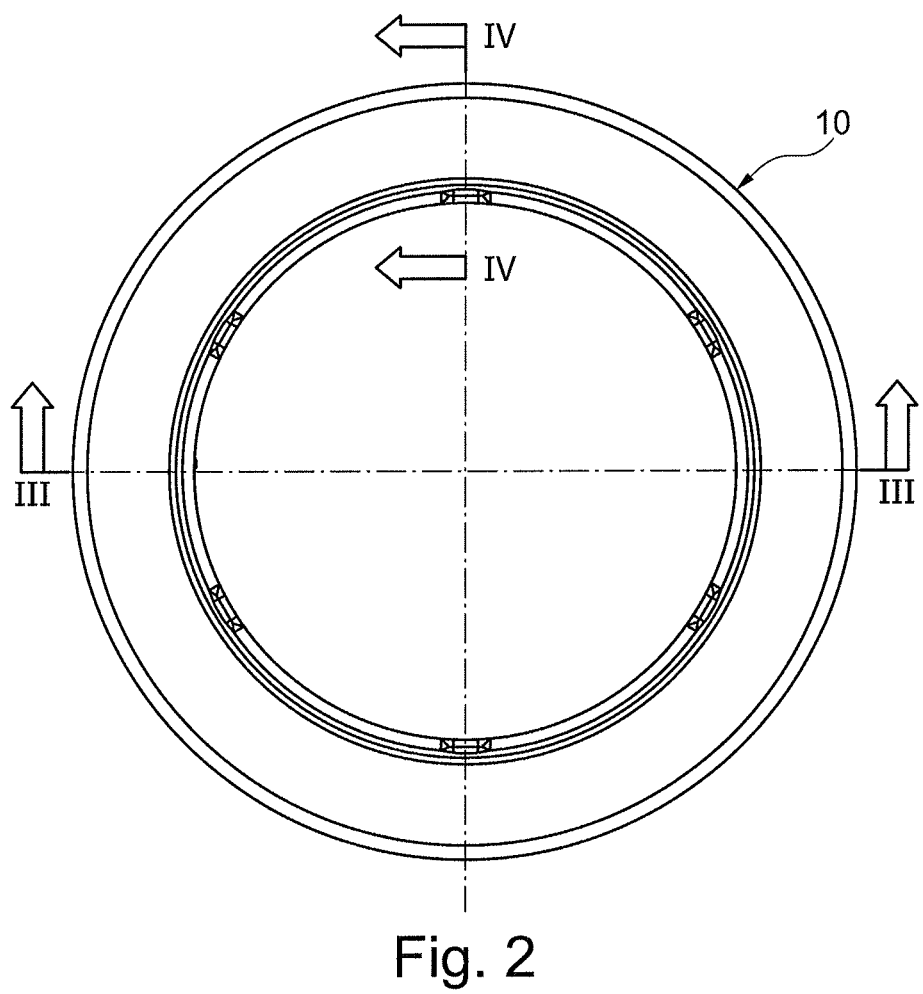
FIG. 2 is a top view of the thrust bearing arrangement of FIG. 1.
Figure 3:
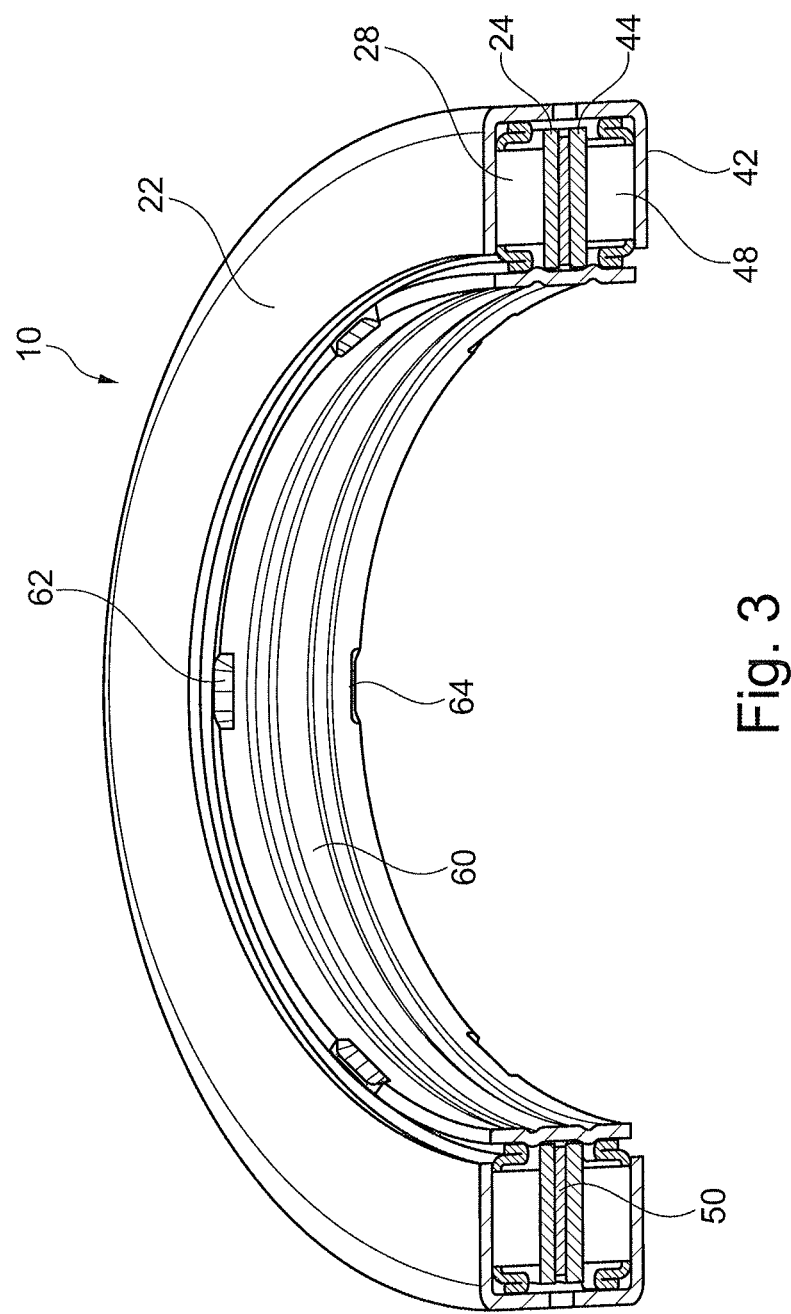
FIG. 3 is a cross sectional view along line III-III from FIG. 2.
Figure 4:
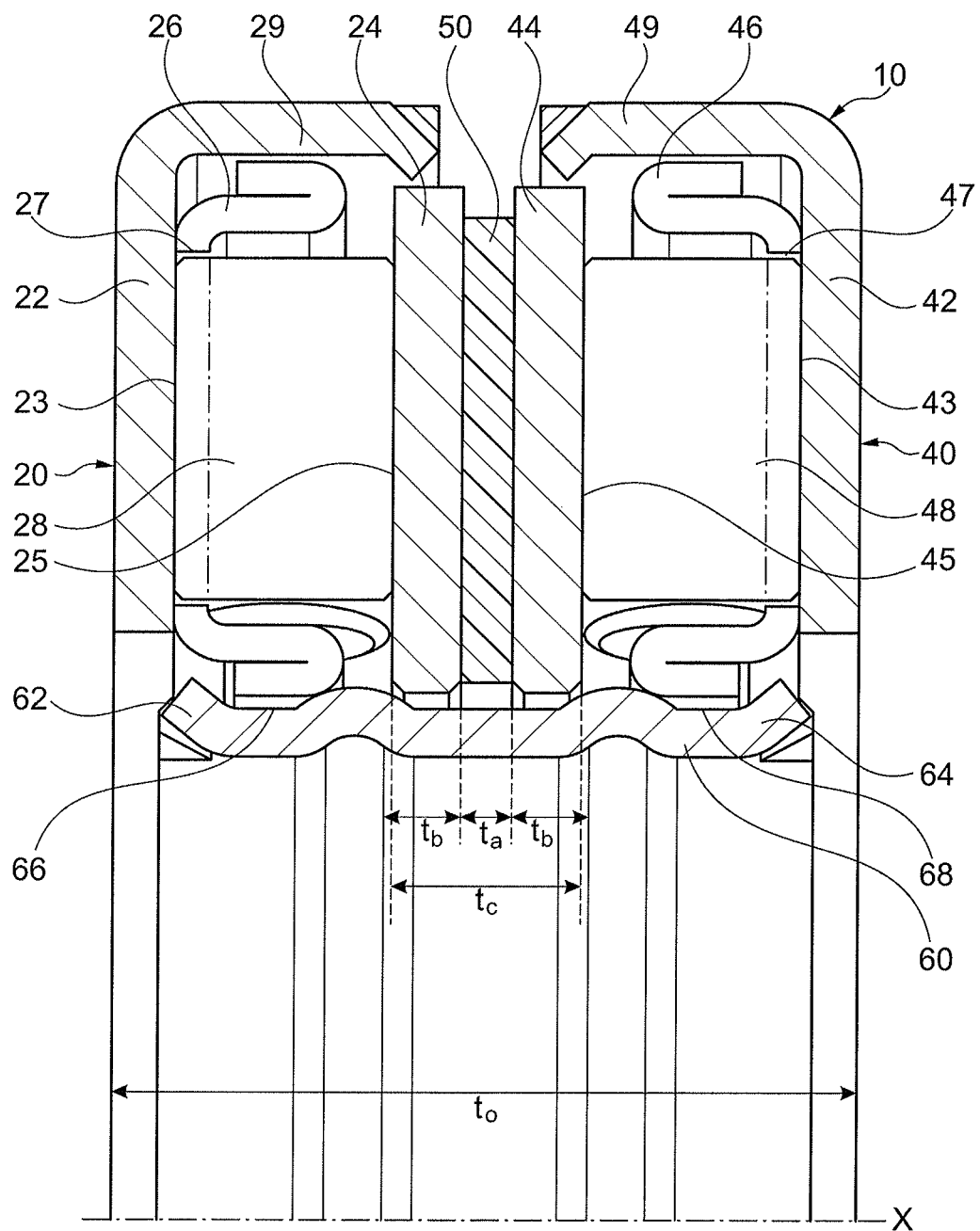
FIG. 4 is a cross sectional view along line Iv-Iv from FIG. 2.

As shown in FIGS. 1-4, a stacked thrust bearing arrangement 10 is disclosed. The arrangement 10 includes a first bearing assembly 20 including a first outer bearing ring 22, a first inner bearing ring 24, a first cage 26, and a first plurality of rolling elements 28.

The first outer bearing ring 22 defines a first outer axial raceway 23 for supporting the first plurality of rolling elements 28 and the first inner bearing ring 24 defines a first inner axial raceway 25 for supporting the first plurality of rolling elements 28. The first cage 26 defines a first plurality of pockets 27 for the first plurality of rolling elements 28.

A second bearing assembly 40 includes a second outer bearing ring 42, a second inner bearing ring 44, a second cage 46, and a second plurality of rolling elements 48. The second outer bearing ring 42 defines a second outer axial raceway 43 for supporting the second plurality of rolling elements 48 and the second inner bearing ring 44 defines a second inner axial raceway 45 for supporting the second plurality of rolling elements 48. The second cage 46 defines a second plurality of pockets 47 for the second plurality of rolling elements 48.

In one embodiment, the rolling elements 28, 48 are cylindrical rollers. One of ordinary skill in the art would understand that varying types of rolling elements could be used.

A central washer 50 is axially positioned between the first inner bearing ring 24 and the second inner bearing ring 44. The central washer 50 is in direct contact with both first inner bearing ring 24 and the second inner bearing ring 44. The central washer 50 is a separately formed part from the first inner bearing ring 24 and the second inner bearing ring 44. In one embodiment, the central washer 50 is assembled between the first inner bearing ring 24 and the second inner bearing ring 44, without any adhesive or other attachment or fastening means.

In one embodiment, the central washer 50 can be assembled or attached to either one of the inner bearing rings 24, 44. In one embodiment, the central washer 50 can be assembled to the inner bearing rings 24, 44 via adhesive or mechanical fasteners.

The central washer 50 provides an improved configuration compared to arrangements having a single common middle ring that defines raceways on both axial sides for the sets of rolling elements. The central washer 50 eliminates excessive noise and wear compared to known thrust bearing arrangements.

An inner sleeve 60 defines a first retention flange 62 adapted to engage the first cage 26 and a second retention flange 64 adapted to engage the second cage 46. The retention flanges 62, 64 provide an axial interference with the cages 26, 46.

The inner sleeve 60 defines a first groove 66 adapted to receive an inner portion of the first cage 26, and defines a second groove 68 adapted to receive an inner portion of the second cage 46.

In one embodiment, the inner sleeve 60 defines a radially innermost portion of the assembly 10. In one embodiment, the first outer bearing ring 22 and the second outer bearing ring 42 each define an axially outermost surface of the assembly 10.

In one embodiment, the central washer 50 is formed from rubber. In one embodiment, the central washer 50 acts as an isolating layer. One of ordinary skill in the art recognizes that any type of material can be used to form the central washer 50. In one embodiment, the central washer 50 can be formed from a vibration-attenuating material.

In one embodiment, the central washer 50 has a thickness ($t_a$) that is less than a thickness ($t_b$) of the first inner bearing ring 24 and the second inner bearing ring 44. One of ordinary skill in the art would understand that the thicknesses of these components can be varied depending on the particular demands for a specific bearing assembly.

In one embodiment, the central washer 50, the first inner bearing ring 24, and the second inner bearing ring 44 have a combined thickness ($t_c$), and the combined thickness ($t_c$) is 20%-30% of an overall thickness ($t_o$) of the stacked thrust bearing arrangement 10. In one embodiment, the combined thickness ($t_c$) is less than 30% of an overall thickness ($t_o$) of the stacked thrust bearing arrangement 10.

In one embodiment, the central washer 50 has a uniformly flat profile. Both axial end faces of the central washer 50 are oriented 90 degrees to the rotational axis (X). The central washer 50 provides identical contact surfaces on either axial side of the central washer 50 for contact with the first inner bearing ring 24 and the second inner bearing ring 44.

In one embodiment, the central washer 50 has a radial depth that is equal to or less than a radial depth of the first inner bearing ring 24 and the second inner bearing ring 44. In one embodiment, the central washer has a radial depth that is less than a radial depth of the first inner bearing ring 24 and the second inner bearing ring 44.

In one embodiment, the first inner bearing ring 24 and the second inner bearing ring 44 are formed from metal. In one embodiment, the first inner bearing ring 24 and the second inner bearing ring 44 are formed from steel.

In one embodiment, a radially outer edge of the central washer 50 is positioned radially inward from radially outer edges of the first inner bearing ring 24 and the second inner bearing ring 44. In one embodiment, the radially outer edge of the central washer 50 is positioned radially inward from radially outer edges of the first outer bearing ring 22 and the second outer bearing ring 42. In one embodiment, a gap is provided between a radially inner edge of the central washer 50 and the inner sleeve 60.

In one embodiment, the first outer bearing ring 22 and the second outer bearing ring 42 each include a radially extending body with an axially extending flange 29, 49. The axially extending flanges 29, 49 of the first outer bearing ring 22 and the second outer bearing ring 42 extend axially inwardly. The axially extending flanges 29, 49 include retention flanges. The first outer bearing ring 22 and the second outer bearing ring 42 have an L-shaped profile, while the first inner bearing ring 24 and the second inner bearing ring 44 each have a flat, straight profile.

In one embodiment, the first and second bearing assemblies 20, 40 are identical to each other, including the same type of sub-components of identical sizes. In another embodiment, the first and second bearing assemblies 20, 40 can have varying components, of varying orientations and/or sizes.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS stacked thrust bearing arrangement 10
first bearing assembly 20
first outer bearing ring 22 first outer axial raceway 23
first inner bearing ring 24
first inner axial raceway 25
first cage 26
first plurality of pockets 27
first plurality of rolling elements 28
axially extending flange 29
second bearing assembly 40
second outer bearing ring 42
second outer axial raceway 43
second inner bearing ring 44
second inner axial raceway 45
second cage 46
second plurality of pockets 47
second plurality of rolling elements 48
axially extending flange 49
central washer 50
inner sleeve 60
first retention flange 62
second retention flange 64
first groove 66
second groove 68

What is claimed is:

1. A stacked thrust bearing arrangement comprising:
a first bearing assembly including a first outer bearing ring, a first inner bearing ring, a first cage, and a first plurality of rolling elements,
the first outer bearing ring defining a first outer axial raceway for supporting the first plurality of rolling elements and the first inner bearing ring defining a first inner axial raceway for supporting the first plurality of rolling elements, the first cage defining a first plurality of pockets for the first plurality of rolling elements;
a second bearing assembly including a second outer bearing ring, a second inner bearing ring, a second cage, and a second plurality of rolling elements,
the second outer bearing ring defining a second outer axial raceway for supporting the second plurality of rolling elements and the second inner bearing ring defining a second inner axial raceway for supporting the second plurality of rolling elements, the second cage defining a second plurality of pockets for the second plurality of rolling elements;
a central washer axially positioned between the first inner bearing ring and the second inner bearing ring; and
an inner sleeve defining a first retention flange adapted to engage the first cage and a second retention flange adapted to engage the second cage,
the inner sleeve further defining a first groove that is adapted to receive an inner portion of the first cage, and a second groove separately formed from the first groove, and the second groove is adapted to receive an inner portion of the second cage.

2. The stacked thrust bearing arrangement of claim 1, wherein the central washer is formed from rubber.

3. The stacked thrust bearing arrangement of claim 2, wherein the first inner bearing ring and the second inner bearing ring are each formed from steel.

4. The stacked thrust bearing arrangement of claim 1, wherein the central washer has a thickness ($t_a$) that is less than a thickness ($t_b$) of both the first inner bearing ring and the second inner bearing ring.

5. The stacked thrust bearing arrangement of claim 1, wherein the central washer, the first inner bearing ring, and the second inner bearing ring have a combined thickness ($t_c$), and the combined thickness ($t_c$) is 20%-30% of an overall thickness ($t_o$) of the stacked thrust bearing arrangement.

6. The stacked thrust bearing arrangement of claim 1, wherein the central washer has a radial depth that is equal to or less than a radial depth of the first inner bearing ring and the second inner bearing ring.

7. The stacked thrust bearing arrangement of claim 1, wherein the central washer has a uniformly flat profile.

8. The stacked thrust bearing arrangement of claim 1, wherein the first outer bearing ring and the second outer bearing ring each have an L-shaped profile including axially inwardly extending flanges.

9. The stacked thrust bearing arrangement of claim 1, wherein the first outer bearing ring and the second outer bearing ring each include a radially extending body with an axially extending flange, and the axially extending flanges extend axially inwardly.

10. The stacked thrust bearing arrangement of claim 1, wherein a gap is provided between a radially inner edge of the central washer and the inner sleeve.

11. A stacked thrust bearing arrangement comprising:
a first bearing assembly including at least one first bearing ring;
a second bearing assembly including at least one second bearing ring;
an inner sleeve defining a first retention flange adapted to engage the first bearing assembly, a second retention flange adapted to engage the second bearing assembly, and two separately formed grooves each dimensioned to receive a cage from a respective one of the first bearing assembly and the second bearing assembly; and
a central washer axially positioned between the at least one first bearing ring and the at least one second bearing ring,
the central washer being formed from rubber, and
the at least one first bearing ring and the at least one second bearing ring being formed from steel.

12. The stacked thrust bearing arrangement of claim 11, wherein the central washer has a uniformly flat profile.

13. The stacked thrust bearing arrangement of claim 11, wherein a gap is provided between a radially inner edge of the central washer and the inner sleeve.

14. The stacked thrust bearing arrangement of claim 11, wherein the central washer is thinner than the at least one first bearing ring and the at least one second bearing ring.

* * * * *